B. P. WELLAND.
HORSE PROTECTOR.
APPLICATION FILED APR. 7, 1914.
1,108,045.
Patented Aug. 18, 1914.
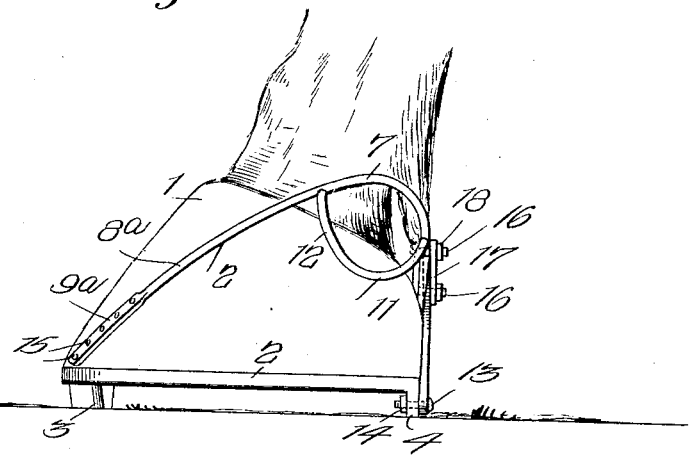
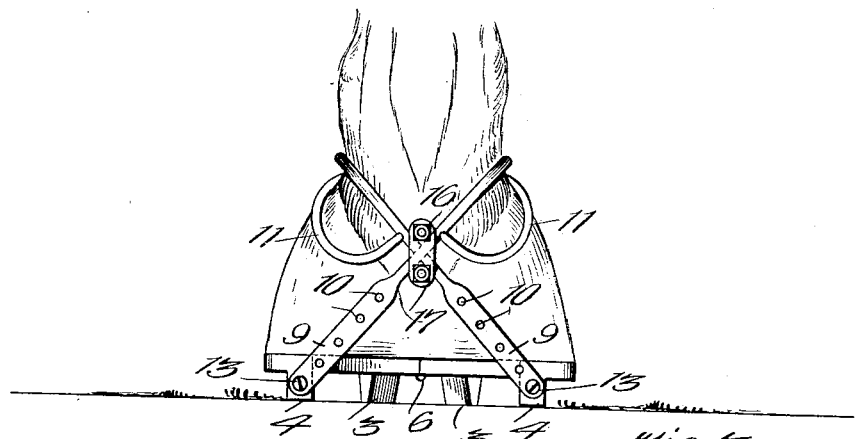
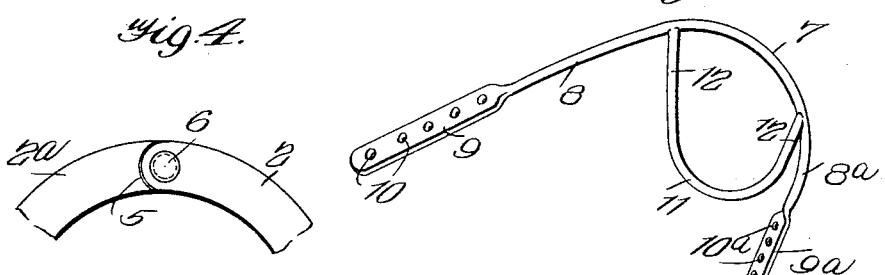
WITNESSES
E. H. Callaghan
Wm. E. Beck.
INVENTOR
BARDENES P. WELLAND,
BY Munn & Co.
ATTORNEYS

UNITED STATES PATENT OFFICE.

BARDENES P. WELLAND, OF BRICELYN, MINNESOTA.

HORSE-PROTECTOR.

1,108,045.  Specification of Letters Patent. Patented Aug. 18, 1914.

Application filed April 7, 1914. Serial No. 830,150.

*To all whom it may concern:*

Be it known that I, BARDENES P. WELLAND, a citizen of the United States, and a resident of Bricelyn, in the county of Faribault and State of Minnesota, have made certain new and useful Improvements in Horse-Protectors, of which the following is a specification.

My invention is an improvement in horse protectors, and has for its object to provide a device of the character specified, especially designed to protect the feet of horses from injury by wire either barbed or plain wherein mechanism is provided capable of attachment to the hoof, and comprising a horse shoe of a particular construction, and protecting mechanism supported by the shoe and by the hoof, the shoe being so arranged that it is not necessary to replace the same at frequent intervals, when used with young horses.

In the drawings: Figure 1 is a side view of the improved protector in place, Fig. 2 is a rear view, Fig. 3 is a perspective view of one of the shields, and, Fig. 4 is a partial bottom plan view of the shoe, showing the joint between the sections.

The present embodiment of the invention is shown in connection with the hoof 1 of a horse, and the invention comprises a shoe composed of sections 2 and $2^a$, the said sections being hinged together at the toe, and each section being provided near the hinge connection with a toe calk 3, and at the opposite end with a heel calk 4. The meeting ends of the sections are rabbeted, as shown at 5 in Fig. 4, to overlap, and a pivot pin 6 is passed through the lapping ends, to pivotally connect the sections at the toe. The shoe sections are of plain light material, and are held to the hoof in any desired manner, and the protecting elements are connected with the shoe and with the hoof.

Each of the protecting elements is a substantially U-shaped rod or bar, comprising a body 7 and arms 8 and $8^a$, the body and a portion of the arms being of round material. The extremity of each arm is flattened, as shown at 9 and $9^a$ respectively, and is provided with a longitudinally extending series of openings 10 and $10^a$ respectively. A substantially U-shaped extension is connected to each of the U-shaped rods or bars, each extension comprising a body 11 and arms 12. The arms 12 are connected with the body of the U-shaped rod, on each side of the center thereof, and the plane of the said extension is at approximately a right angle to the plane of the U-shaped rod or bar.

The protecting elements are arranged as shown in Figs. 1 and 2, the bodies 7 of the said elements engaging over the hoof in such manner that the extensions 11—12 will cover the fetlock, and will extend away from each other, as shown more particularly in Fig. 2. The flattened portion 9 of each U-shaped rod or bar is connected to a heel calk 4, by means of a screw bolt 13 or the like which passes through one of the openings 10, and a registering opening in the heel calk. Each screw bolt is passed from the rear forwardly, and is engaged by a nut 14 on the inner side of the calk. One end of each of the U-shaped rods or bars is engaged with the heel calk of the opposite shoe section, and the other end of each of the said members engages the hoof near the front thereof, and on the opposite side from the shoe section to which the other end of the said rod or bar is connected. Screws 15 or the like are passed through the openings $10^a$ at the last-named end of each of the said U-shaped rods or bars, and into engagement with the material of the hoof.

It will be noted from an inspection of Fig. 3, that the flattened portion 9 of each protector is of greater area than the flattened portion $9^a$ at the opposite end, and that the openings 10 at the said end are larger than the openings $10^a$ at the other end.

The arms 8 of the U-shaped rods or bars cross each other at the rear of the hoof, as shown in Fig. 2, and the said arms are clamped together at this point, by means of a substantially U-shaped clip. The body of the clip is arranged between the arms and the hoof, and the arms 16 of the clip extend above and below the crossing of the arms. A plate 17 provided at each end with an opening engages the arms 16 of the clip on the opposite side of the arms $8^a$ from the body of the clip, and nuts 18 are threaded onto the arms outside of the plate.

The improved structure can be attached to the hoofs of young horses, and without the necessity of resetting the shoes at short intervals as with the ordinary shoe. The sectional character of the shoe and the jointed connection between the sections permits the hoof to expand and to grow, without clamping or deforming the hoof because of pressure of the shoe.

It is well known that horses are frequently injured, being cut about the fetlocks by barbed or plain wire, due to the horses pawing over or near the fence, and getting their feet caught. As the animal strikes, the foot will become caught on the wire at the fetlock, and serious injury will result. With the improvement, however, this is not liable to occur. One of the arms 12 of each extension is spaced rearwardly from the fetlock, in such manner as to deflect the wire from this point. The wire will slide down over the arms of the protecting devices, and will become disengaged from the shoe. The attachment as a whole is light, does not discommode the horse, and prevents injury to the feet especially during growth.

I claim:—

1. A device of the character specified, comprising a sectional shoe, the sections being similar and being pivotally connected at the toe, and each section having a toe calk near the connection and a heel calk at the opposite end, a pair of substantially U-shaped protecting rods, each rod having its ends flattened and provided with openings, a screw bolt passing through one of the openings at one end, each heel calk having an opening for receiving the adjacent screw bolt, the other end of each U-shaped rod being connected with the hoof at the front thereof and near the front end of the opposite section of the shoe, said rods crossing each other at the rear of the hoof, means for clamping the rods together at their crossing, and a substantially U-shaped extension connected with each of the said rods at approximately the center thereof, said extensions extending downwardly away from each other at the rear of the fetlock.

2. A device of the character specified, comprising a sectional shoe, the sections being similar and being pivotally connected at the toe, and each section having a toe calk near the connection and a heel calk at the opposite end, a pair of substantially U-shaped protecting rods, each rod having its ends flattened and provided with openings, a screw bolt passing through one of the openings at one end, each heel calk having an opening for receiving the adjacent screw bolt, the other end of each U-shaped rod being connected with the hoof at the front thereof and near the front end of the opposite section of the shoe, said rods crossing each other at the rear of the hoof.

3. A device of the character specified, comprising a shoe consisting of sections hinged together at the toe, each section having toe and heel calks, and a pair of substantially U-shaped protecting rods, each of the rods embracing one side of the hoof and having one end pivoted to the heel calk of the opposite section of the shoe and having the other end connected to the hoof near the toe, said rods crossing at the rear of the hoof, a clamping device for clamping the rods together at the crossing, and an extension on each rod, the extensions extending downwardly and outwardly for protecting the rear of the foot above the hoof.

4. A device of the character specified, comprising a shoe consisting of sections hinged together at the toe, each section having toe and heel calks, and a pair of substantially U-shaped protecting rods, each of the rods embracing one side of the hoof and having one end pivoted to the heel calk of the opposite section of the shoe and having the other end connected to the hoof near the toe, said rods crossing at the rear of the hoof.

5. A device of the character specified, comprising a pair of substantially U-shaped rods or bars, each rod or bar being adapted to embrace one side of the hoof, and having means for permitting one end to be connected to the hoof near the toe, a shoe consisting of sections hinged together at the toe, a pivotal connection between the other end of each rod and the opposite section of the shoe at the heel, the rods crossing at the rear of the hoof, and each having an extension extending downwardly and outwardly, and means for clamping the rods together at their crossing.

6. A device of the character specified, comprising a pair of substantially U-shaped rods or bars, each rod or bar being adapted to embrace one side of the hoof, and having means for permitting one end to be connected to the hoof near the toe, a shoe consisting of sections hinged together at the toe, a pivotal connection between the other end of each rod and the opposite section of the shoe at the heel, the rods crossing at the rear of the hoof, and each having an extension extending downwardly and outwardly.

7. A device of the character specified comprising a pair of substantially U-shaped rods or bars, each rod or bar being adapted to embrace one side of the hoof, and having means for permitting one end to be connected to the hoof near the toe, and having a series of openings at the other end for permitting the said end to be attached to the shoe, each rod having a substantially U-shaped extension at approximately the center thereof and at approximately a right angle to the plane of the rod or bar.

BARDENES P. WELLAND.

Witnesses:
M. E. MASON,
H. J. FRUNDT.

Copies of this patent may be obtained for five cents each, by addressing the "Commissioner of Patents, Washington, D. C."